(12) United States Patent
Friesen

(10) Patent No.: US 10,414,319 B2
(45) Date of Patent: Sep. 17, 2019

(54) PORTABLE DRIVE-OVER CONVEYOR APPARATUS WITH FIRST AND SECOND CONVEYORS

(71) Applicant: Hi-Crush Canada Inc., Houston, TX (US)

(72) Inventor: Henry Friesen, Winkler (CA)

(73) Assignee: Hi-Crish Canada Inc., Houston, TX (US)

( * ) Notice: Subject to any disclaimer, the term of this patent is extended or adjusted under 35 U.S.C. 154(b) by 153 days.

(21) Appl. No.: 15/159,139

(22) Filed: May 19, 2016

(65) Prior Publication Data

US 2017/0334654 A1 Nov. 23, 2017

(51) Int. Cl.
*B60P 1/36* (2006.01)
*B65G 41/00* (2006.01)
*B65G 67/24* (2006.01)

(52) U.S. Cl.
CPC .............. *B60P 1/36* (2013.01); *B65G 41/005* (2013.01); *B65G 67/24* (2013.01)

(58) Field of Classification Search
CPC .... B65G 41/002; B65G 41/008; B65G 47/16; B65G 67/24; B65G 67/08; B61D 47/00; B60P 1/36
See application file for complete search history.

(56) References Cited

U.S. PATENT DOCUMENTS

| | | | | |
|---|---|---|---|---|
| 2,834,487 | A * | 5/1958 | Gaddis | B60P 1/36 198/313 |
| 4,624,357 | A * | 11/1986 | Oury | B65G 21/14 198/313 |
| 4,813,839 | A * | 3/1989 | Compton | B65G 41/002 180/209 |
| 5,297,914 | A * | 3/1994 | Ash | B65G 67/24 180/298 |
| 5,964,566 | A * | 10/1999 | Stewart | B65G 67/24 198/302 |
| 7,424,943 | B2 * | 9/2008 | Gausman | B65G 67/24 198/311 |
| 8,573,917 | B2 * | 11/2013 | Renyer | A01C 15/003 414/523 |
| 9,663,303 | B2 * | 5/2017 | Waldner | B65G 41/002 |

(Continued)

FOREIGN PATENT DOCUMENTS

EP     0175422 A1 *  3/1986  .......... B65G 41/008

*Primary Examiner* — Glenn F Myers
(74) *Attorney, Agent, or Firm* — Baker Botts L.L.P.

(57) ABSTRACT

A portable conveyor apparatus comprises a trailer arranged for towing behind a highway tractor with ramps which are positionable so that a dump truck may drive over the trailer and discharge particulate material into an inlet supported on a frame of the trailer. The conveyor apparatus features a first conveyor carried by the trailer frame so as to extend longitudinally thereof for carrying the particulate material along the trailer. The apparatus also features a second conveyor which is carried by the trailer frame adjacent the first conveyor for transferring the particulate material received and carried by the first conveyor to another location beyond the trailer. The second conveyor is positionable in a working position such as when it operates to convey the particulate material and in a transport position where the second conveyor lies within the periphery of the trailer frame during transportation.

12 Claims, 13 Drawing Sheets

(56) References Cited

U.S. PATENT DOCUMENTS

| | | | |
|---|---|---|---|
| 2010/0135758 A1* | 6/2010 | Gallione | B60P 1/36 |
| | | | 414/505 |
| 2013/0233682 A1* | 9/2013 | Werlinger | B65G 21/10 |
| | | | 198/861.2 |
| 2016/0052732 A1* | 2/2016 | Toews | B65G 47/18 |
| | | | 198/302 |
| 2016/0297628 A1* | 10/2016 | Petersen | A01C 15/003 |
| 2017/0327024 A1* | 11/2017 | Ozinga | B60P 3/16 |

* cited by examiner

PORTABLE DRIVE-OVER CONVEYOR APPARATUS WITH FIRST AND SECOND CONVEYORS

FIELD OF THE INVENTION

The present invention relates generally to a portable drive-over conveyor apparatus, and more particularly to such a portable drive-over conveyor apparatus with a first conveyor for receiving material upon unloading and a second conveyor operably receiving the material from the first conveyor for subsequent discharge from the apparatus.

BACKGROUND

Road transportation is a popular means for transporting particulate material such as aggregate, salt, grain, and fertilizer across substantial distances on land. Furthermore, the trucks and/or trailers containing these materials during transportation must eventually be unloaded at some point during the transportation operation so as to be moved therefrom to a stationary storage location or another transportation apparatus like a train or ship.

Particulate materials are especially but not exclusively suited for stacking in a stockpile for storage, for which stacking conveyors are popular and particularly suited.

Also, the trucks and trailers provide relatively flexible transportation which is not necessarily limited to, for example, paved roadways as most such trucks and trailers are durable enough to travel over unpaved surfaces as well. As such, road transportation may be farther reaching on land than for example rail transportation.

It may thus be desirable to have arrangements for unloading these trucks and trailers and transferring their contents to another location that are portable as well, so as to not be necessarily fixed to a predetermined location.

The Applicant provides a unique solution for such portable conveyor apparatuses.

SUMMARY OF THE INVENTION

According to one aspect of the invention there is provided a portable conveyor apparatus comprising:

a trailer having a frame with forward and rear ends opposite one another on a trailer axis and first and second sides spanning between the forward and rear ends longitudinally of said trailer axis where the front end, rear end, first side, and second side collectively define a periphery of the frame;

the trailer including a hitch coupling supported at the front end of the trailer for coupling to a towing vehicle;

the trailer including a plurality of wheels rotatably coupled to the frame such that the trailer is towable across a support surface by the towing vehicle;

a first conveyor carried by the frame and extending longitudinally of the trailer axis between the forward and rear ends of the trailer;

the first conveyor including an inlet at a location between the first and second sides that is adapted to receive particulate material discharged from a vehicle driven over the frame of the trailer;

a second conveyor carried by the frame at a position spaced longitudinally of the inlet of the first conveyor for transferring the particulate material received and carried by the first conveyor to another location beyond the trailer;

the second conveyor being positionable in a transport position in which the second conveyor lies substantially within the periphery of the frame of the trailer in horizontal orientation with a free end of the second conveyor at the front end of the frame during transportation, and in a working position in which the second conveyor extends from the frame to a location beyond the periphery of the trailer.

That is, in the transport position the second conveyor is located in horizontal orientation over the whole of the frame of the trailer. A bottom end of the second conveyor which may be arranged for resting on the trailer in the working position may extend beyond the rear end of the frame but only by amount which is acceptable so that the conveyor apparatus is towable on a roadway such as a highway.

Preferably, the inlet of the first conveyor is located rearward of the front end of the trailer with the second conveyor being mounted to the frame at a mounting location rearwardly of said inlet and the first conveyor spanning a distance between its inlet and the mounting location of the second conveyor on the frame. The particulate material is thus transferred longitudinally of the trailer axis along the first conveyor and then moved onto the second conveyor which discharges the material beyond the periphery of the trailer. The particulate material may thus be discharged in a manner forming a stockpile in an open area or for example a barge, rail car, bin or silo. The portable conveyor apparatus may thus provide a suitable stacking conveyor for particulate material.

In one arrangement, there is provided a motor arrangement for driving the first and second conveyors which is located forward of the inlet of the first conveyor.

Preferably, the second conveyor is movable between the transport position and the working position by pivotal movement about a folding axis which is transverse to the trailer axis.

Preferably, the second conveyor is swivably mounted on the frame so as to be rotatable about an upstanding axis to the trailer axis such that the particulate material is dischargeable at different locations angularly of the trailer axis in a horizontal plane containing the trailer axis.

The second conveyor may comprise a plurality of telescoping sections respectively defining a portion of the second conveyor with the telescoping sections being movable each to the next along a conveyor axis of the second conveyor parallel to which the particulate material is transferred along the second conveyor so as to vary a length of the second conveyor for discharging the particulate material at different distances horizontally outwardly from the periphery of the trailer.

In one arrangement, a first one of the telescoping sections, which is supported in fixed relation to a mounting arrangement which mounts the second conveyor to the trailer, is supported in overlapping configuration with another one of the telescoping sections which is extendable relative to the first section such that the particulate material is transferrable from one telescoping section to the next therebelow when the second conveyor is in the working position and said another one of the telescoping sections is extended beyond the first one of the telescoping section.

In one arrangement, the first conveyor includes a discharge spaced above an inlet of the second conveyor in the working position.

In one arrangement, the second conveyor is uncovered across its width and along its length.

In one arrangement, there is provided a ramp assembly on either side of the frame where the inlet of the first conveyor is located, and each ramp assembly is movable from a position upstanding to the frame of the trailer to a position extending transversely outwardly from the trailer lying generally in a common plane with the other ramp assembly so that a truck to be unloaded is drivable over the ramp assemblies transversely of the trailer in order to position the truck over the inlet of the first conveyor for unloading.

According to one aspect of the invention there is provided a portable conveyor apparatus comprising:

a trailer having a frame with front and rear ends opposite one another on a trailer axis and first and second sides spanning between the forward and rear ends longitudinally of said trailer axis where the front end, rear end, left side, and right side collectively define a periphery of the frame;

the trailer including a hitch coupling supported at the front end of the trailer for coupling to a towing vehicle;

the trailer including a plurality of wheels rotatably coupled to the frame such that the trailer is towable across a support surface by the towing vehicle;

a first conveyor carried by the frame and extending longitudinally of the trailer axis between the front and rear ends of the trailer;

the first conveyor including an inlet at a location between the left and right sides that is adapted to receive particulate material discharged from a vehicle driven over the frame of the trailer;

a ramp assembly on either side of the frame where the inlet of the first conveyor is located;

each ramp assembly being movable from a position upstanding to the frame of the trailer about a longitudinal axis along the respective side of the frame to a position extending transversely outwardly from the trailer lying generally in a common plane with the other ramp assembly so that the vehicle to be unloaded is drivable transversely of the trailer over the ramp assemblies in order to be positioned over the inlet of the first conveyor for unloading;

a second conveyor carried by the frame at a position spaced longitudinally of the inlet of the first conveyor for transferring the particulate material received and carried by the first conveyor to another location beyond the trailer;

the second conveyor being positionable in a transport position in which the second conveyor lies substantially within the periphery of the frame of the trailer in horizontal orientation with a free end of the second conveyor at the front end of the frame during transportation when the ramp assemblies are in the upstanding position, and in a working position in which the second conveyor extends from the frame to a location beyond the periphery of the trailer.

BRIEF DESCRIPTION OF THE DRAWINGS

Preferred arrangements of the invention will now be described in conjunction with the accompanying drawings in which.

In the drawings like characters of reference indicate corresponding parts in the different figures.

DETAILED DESCRIPTION

The figures show a novel portable drive-over conveyor apparatus 1 which is suited for transferring particulate material, such as aggregate, salt, grain, and fertilizer, that is unloaded from a dump truck (not shown) and moved from the truck to another location in proximity to the portable conveyor apparatus. For example, this other location may comprise an open area adjacent the portable conveyor apparatus such that the particulate material is simply unloaded into an uncontained stockpile, or this other location may comprise a barge, ship, rail car, another trailer, bin, silo, or indoor bulk storage facility.

The portable drive-over conveyor apparatus 1 thus comprises a trailer 4 forming a base of the portable conveyor apparatus. The trailer has an overall frame 6 with a front end 8A, rear end 8B, and left and right sides 8C and 8D spanning between the front and rear ends. The trailer thus comprises a trailer axis T with the front and rear ends 8A, 8B being longitudinally spaced apart along the trailer axis T and the left and right sides 8C, 8D of the trailer extending longitudinally of the trailer axis T.

Figure 1:
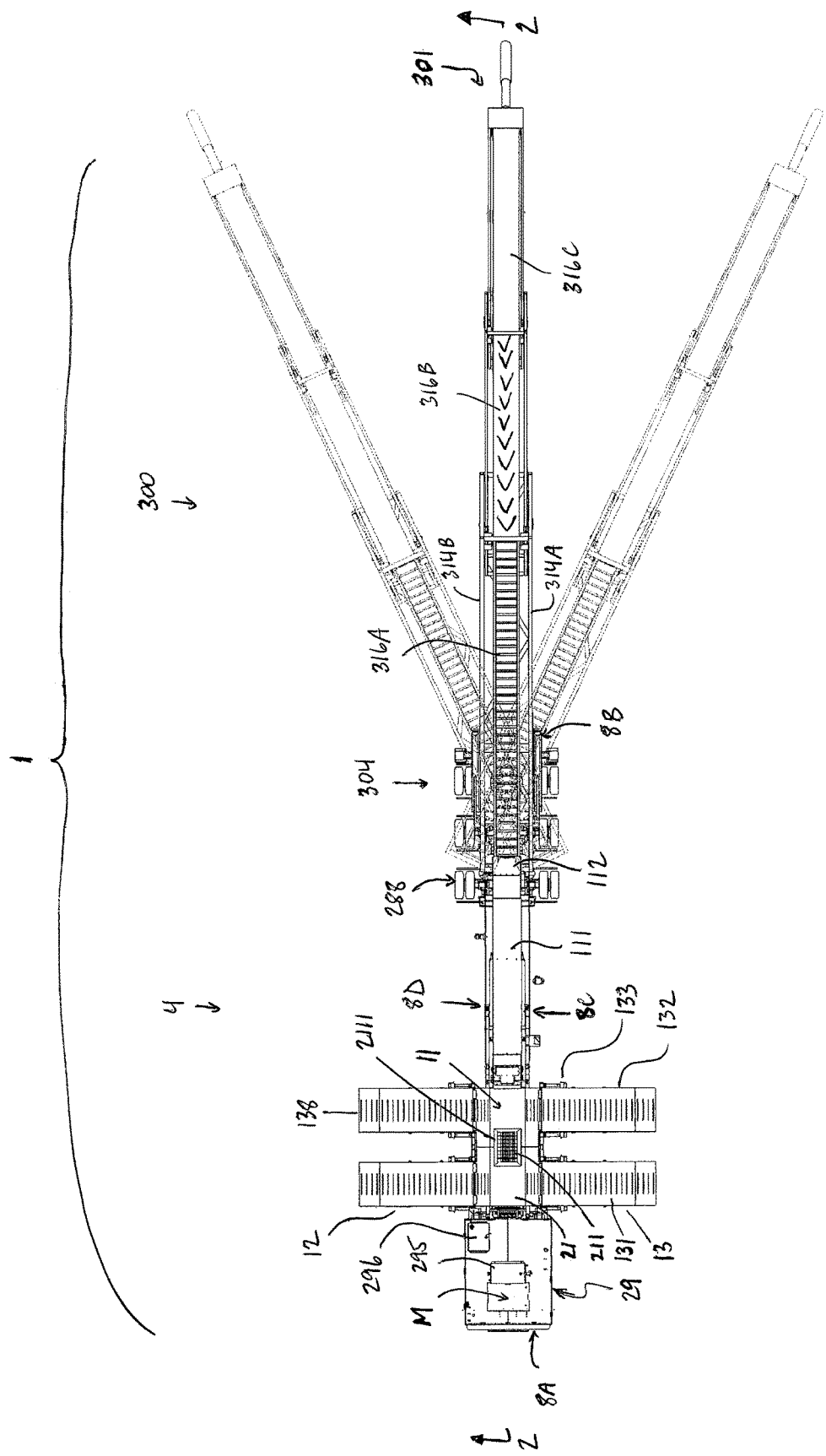
FIG. 1 is a top plan view of portable conveyor apparatus according to the present invention with the portable conveyor apparatus arranged in a working position. A plurality of positions of a second conveyor of the portable conveyor apparatus are shown in ghost.

The front end, rear end, and left and right sides 8A-8D collectively define a periphery of a frame of the trailer which is more clearly shown in top plan view in FIG. 1. It will be appreciated that an overall width of the trailer 4 is non-uniform along its length from front 8A to rear 8B, such that the periphery may not be a regularly shaped polygon, as for example a rectangle, but instead may be irregularly shaped so as register with those features of the portable conveyor apparatus which extend transversely from the central trailer axis T at different distances therefrom. Furthermore, the periphery of the trailer may vary in shape from one position of ramp assemblies 12, 13 to the next as will become apparent shortly.

The arrangement shown herein includes a center frame structure 11, a first ramp assembly 12 on one side, and a second ramp assembly 13 on the second side so that the truck to be unloaded can drive over the apparatus entering from one ramp, halting with a discharge of the truck at the center section and then departing over the second ramp.

Figure 8:
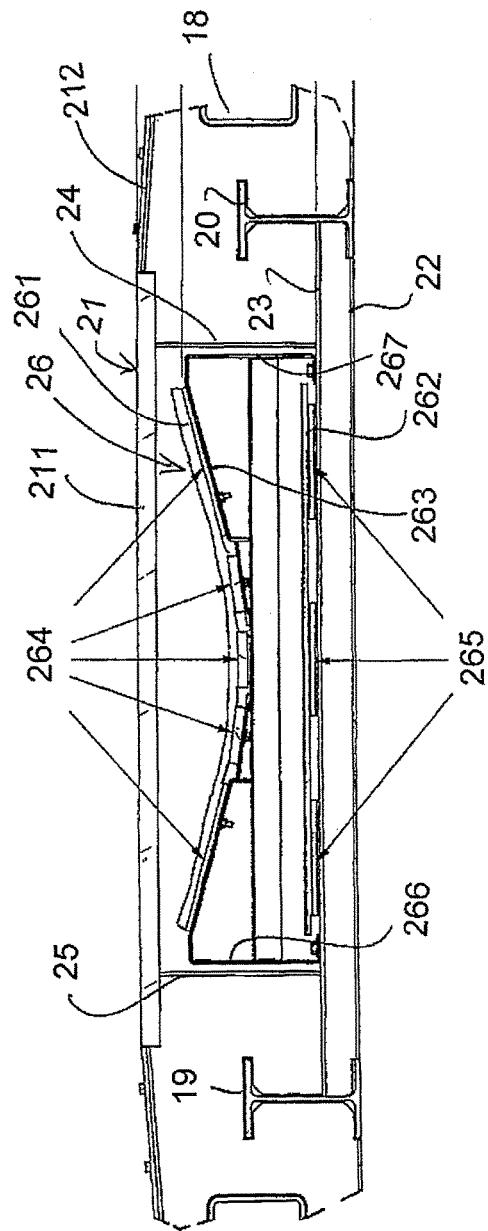
FIG. 8 is part only of the cross sectional view of FIG. 5 on an enlarged scale showing the conveyor.
Figure 9:
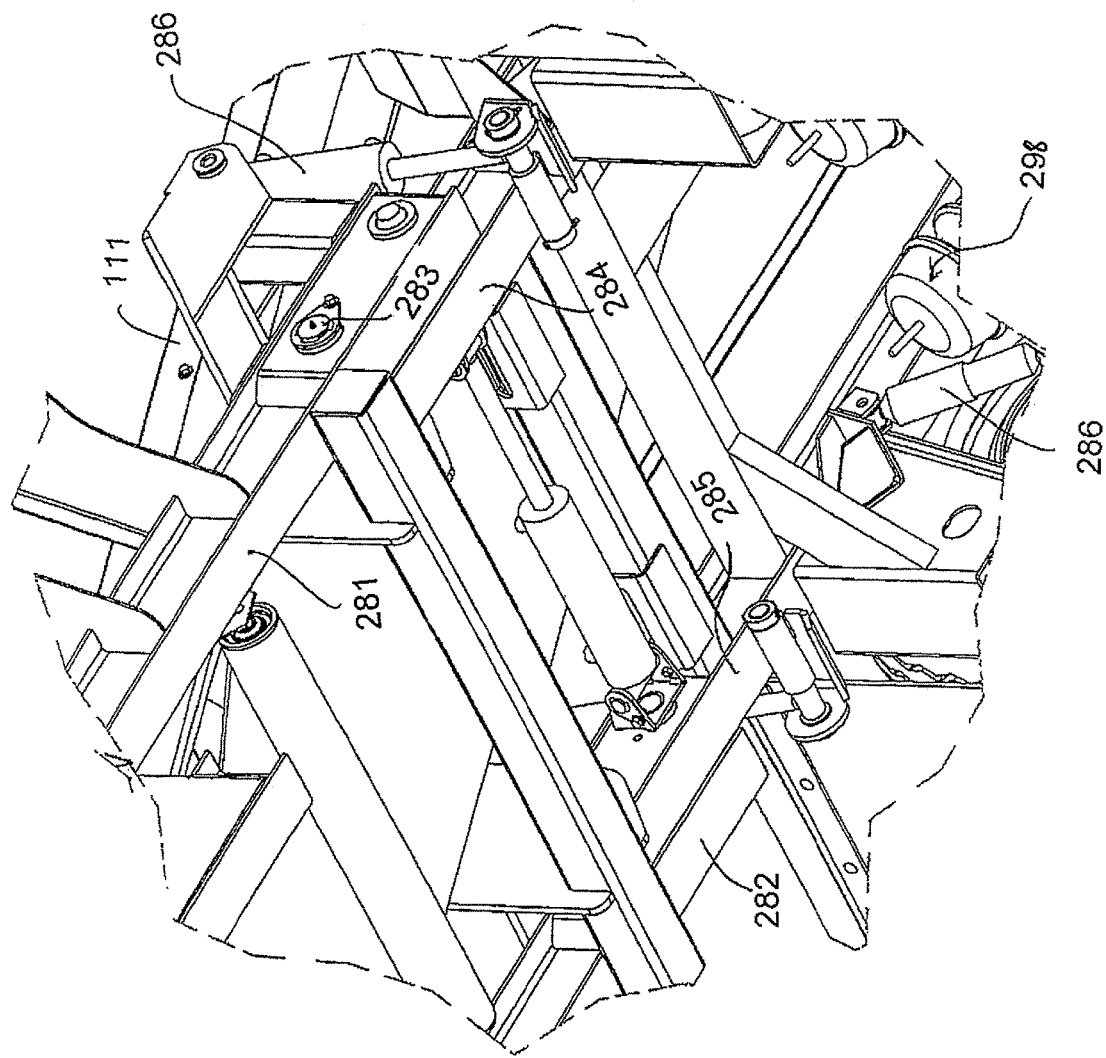
FIG. 9 is an isometric view from underneath of the rear section only of the portion of FIG. 3.
Figure 11:
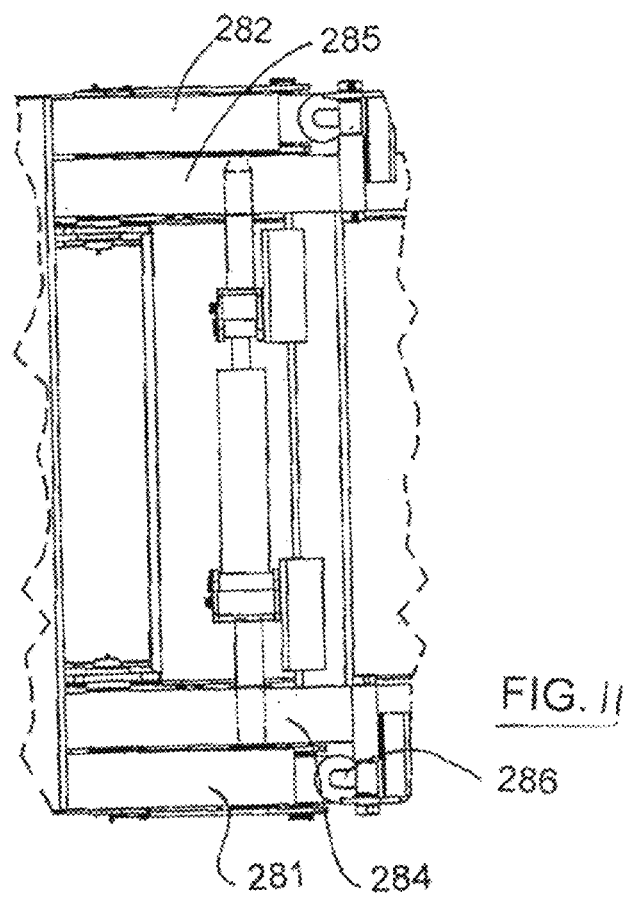
FIG. 11 is a side view of a part only of the rear section of FIG. 9.
Figure 10:
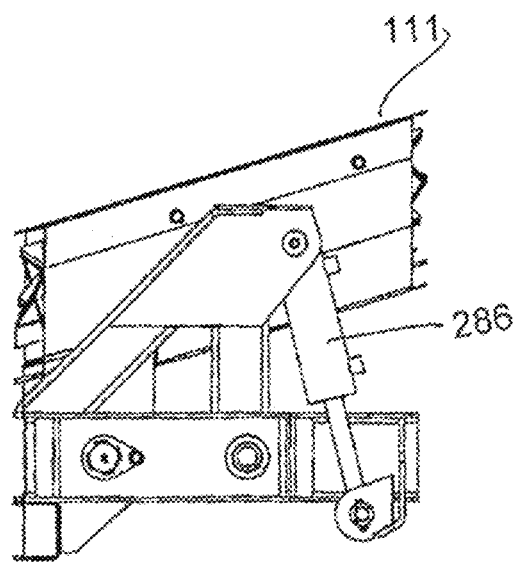
FIG. 10 is a plan view of a part only of the rear section of FIG. 9.

The center frame structure 11 has a forward end 15, a rearward end 16 and first and second sides 17, 18. The center frame structure includes a pair of longitudinal beams 19, 20 forming the main structural components, an upper support surface 21 and a bottom cover panel 22. The panel 22 sits on the ground during operation and the beams support the top surface 21 on a transverse wall 23 and upstanding walls 24, 25 (FIG. 8). The top support surface 21 extends along the full length of the center section.

The first and second ramp assemblies 12, 13 are symmetrically mounted on the respective side 18 for pivotal movement about an axis 181 longitudinal of the first side 18 (or second side 17) from a raised position standing vertically upwardly above the first side 18 for transport of the apparatus from place to place. When delivered to a required location, the ram assemblies are lowered to an operating position extending outwardly from the respective side as shown in the Figures to define a ramp allowing a truck wheel to move from the ground onto the center frame structure for the delivery process.

Each ramp assembly comprises two side by side parallel ramps 131 and 132 which can be raised and lowered by cylinders 133 at sides of the ramps.

Each ramp includes an inclined upper surface 135 attached at its edges to two triangular sides 137 which attach also to a bottom wall 136 which sits on the ground and transfers loads from the vehicle to the ground from the upper surface 135. The upper surface and the bottom surface converge to an edge 138 at the outer end of the ramp which is sufficiently sharp to allow the vehicle wheel to enter onto the ramp without the necessity for an earthen ramp beyond the edge 138. The ramps and the center frame structure thus provide upper surfaces for supporting the truck as it passes from the first ramp over the center frame structure and onto the second ramp. The ramps 131, 132 are spaced along the side edges of the center section by a space 139 so that any material from the vehicle which does not enter onto the center section for conveying falls to the ground rather than is collected on the ramps.

A first conveyor 26 is arranged to extend along the center frame structure 11 and arranged to transport the particulate material longitudinally along the center frame structure 11 up an inclined section 111 of the first conveyor to a discharge chute 112 at one end of the center frame structure which is at a rear frame 28 at the rear end 16. The center frame structure 11 and rear frame 28 collectively define part of the overall frame 6 of the trailer.

The upper surface 21 of the center frame structure 11 has a central rectangular grate 211 defining an inlet of the first conveyor for passage of the particulate material discharged on the grate through the upper surface to the conveyor 26. The grate is spaced from the side edges of the upper surface and from the ramps and forms a relatively localized area within the upper surface. Thus, the first conveyor's inlet is located between the left and right sides 8C, 8D of the overall frame.

The grate is substantially equal in width to the space 139 between the ramp members so that lifting of the ramps to the raised position does not cause any material to fall from the ramps into the grate.

Furthermore, the inlet of the first conveyor includes a funneling structure 2111 extending around a full periphery of the grate 211 with upstanding edges of the funneling structure diverging from an upstanding axis at the first conveyor's inlet such that the funneling structurer has an open top which is larger than the grate. This may help to catch particulate material which may otherwise miss the inlet if the material discharges improperly from the truck.

The upper surface of the center frame structure has on each side of the grate a respective ramp portion 212, 213 inclined downwardly and outwardly from the flat upper surface so as to act as a commencement of the ramp which has an outer edge 214 contiguous with an inner edge of the respective ramp assembly.

The center structure 11 has at the front edge 15 a frame component 29 attached to the center frame structure at the forward end so as to extend forwardly therefrom and includes a planar platform 292 generally parallel to the center frame structure at a height raised from the center frame structure. The platform 292 is attached to the center structure by a frame connection which is designed to transfer loads during transport from the center section to the platform so that the platform is cantilevered forwardly from the center frame structure 11. The free end of the platform, opposite to that end which is attached to the center frame structure, thus defines the front end 8A of the trailer's overall frame. Furthermore, the platform carries drive components including a motor arrangement M together with hydraulic drive systems and control units 295, 296 for conveyors of the portable conveyor apparatus 1.

Underneath the platform is provided a king pin 291 depending from an underside of the frame for engaging a towing platform of a highway tractor (not shown). As such, the king pin together with the platform define a hitch coupling of the trailer 4.

The frame platform at the frame 293 connecting to the center section carries conventional jacking legs used on semi-trailers to jack to the ground. The legs which can be moved from a raised position in which the center frame structure rests on the ground to a lowered position in which feet of the legs sit on the ground and lift the center frame structure to be raised from the ground and the towing platform of a highway tractor, defining a towing vehicle, can move underneath the king pin.

The rear frame structure 28 extends rearwardly from the center frame structure at a position thereon raised from a bottom of the center frame structure and carries the upwardly and rearwardly extending portion 111 of the conveyor 11. The rear frame includes a pair of parallel beams 281, 282 connected at a forward end to a frame coupling to the center section to transfer loads therebetween. An inner frame defined by parallel beams 284, 285 located inside the beams 281, 282 is pivotal relative to the outer frame on a transverse pivot pin. The inner frame is pivotal by a drive cylinder 286 and can be locked in a lowered position for transport by a locking pin 297 which drives a pin across aligned holes of the beams. The inner frame carries a plurality of wheel and axle assemblies 288 for movement relative to the center frame structure and the outer rear frame from a lowered road position to a raised position allowing the center frame structure 11 to rest on the ground. The wheel and axle assembly includes highway tires and a gas bag suspension 298 of the relative to the inner frame which is arranged for highway travel. As such, wheels 289 are rotatably coupled to the overall frame 6 such that the trailer is towable across a support surface or roadway by the towing vehicle, such as the highway tractor.

Each of the ramp assemblies tapers to the outer ramp edge 138 and a length between the outer ramp edge 138 of the first pair of ramps and the other ramps is at least 25 feet and preferably of the order of 28 feet which combined with a height of the center structure from the ground to the upper surface which is of the order of or less than 12 inches allows conventional belly discharge highway semi-trailers to pass over without grounding out and without requirement for any earthen ramp beyond the edges 138.

Figure 7:
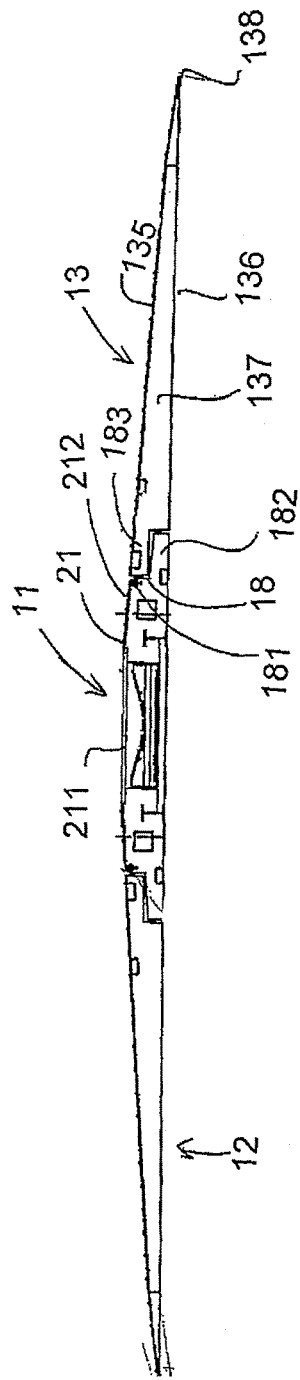
FIG. 7 is transverse cross sectional view of the embodiment of FIG. 1.

As shown in FIG. 7, the center frame structure 11 includes for each ramp assembly 12, 13 an outwardly extending shoulder 182 on which the inner edge 183 of the respective ramp assembly sits. This acts to transfer loads form the ramp as the truck passes over from the ramp to the center structure and to reduce loading on the pivot at the axis 181.

As shown in FIG. 8, the conveyor 26 includes a belt 261 which has an upper run underneath the grate 211 which sits on a downwardly concave support surface 263 carried by the center frame structure at the transverse sheet 23 of the beams 19, 20. The support surface 263 carries a plurality of stationary strips 264 of a plastics bearing material on which the upper run of the belt slides. This allows the belt to slide effectively and avoids the increase in height that would in incurred if rollers were used. The concave shape of the belt and support provides space for the sand to enter and be carried on the belt while again avoiding an increase in height of the center section. The return run 262 of the belt slides on a bottom support surface defined by the sheet 23 on which is provided a plurality of stationary strips 265 of the plastics bearing material. The support sheet 263 is carried on upstanding side sheets 266, 267 carried on the sheet 23.

Thus, in summary of a first base portion 299 of the portable conveyor apparatus 1, the portable conveyor apparatus includes the trailer 4 to be towed as a highway semi-trailer. The conveyor apparatus 1 includes the center frame structure 11 containing a conveyor belt, defined by the first conveyor 26, with two pivotal ramps on each side to be moved to a raised position standing upwardly and a lowered position extending outwardly. The ramps have sufficient length and the center structure has a low height to allow a highway semi-trailer to pass over a grate in the center structure. A platform is attached at the forward end with a king pin on the underside for engaging a towing platform of a highway tractor. Wheel and axle assemblies including suspension of the axles for highway travel is mounted on a sub-frame pivotal relative to main rear frame for movement relative to the center frame structure from a lowered road position to a raised position allowing the center frame structure to rest on the ground.

Turning now to a second discharging portion 300 of the portable conveyor apparatus, there is provided a second conveyor 301 carried at a rear end 8B and mounted at the rear frame 28 so as to be spaced rearwardly of the first conveyor's inlet 211. The combination of first and second conveyors thus moves the particulate material longitudinally rearwardly of the first conveyor's inlet and, typically, to some location rearward of the trailer 4.

Figure 12:
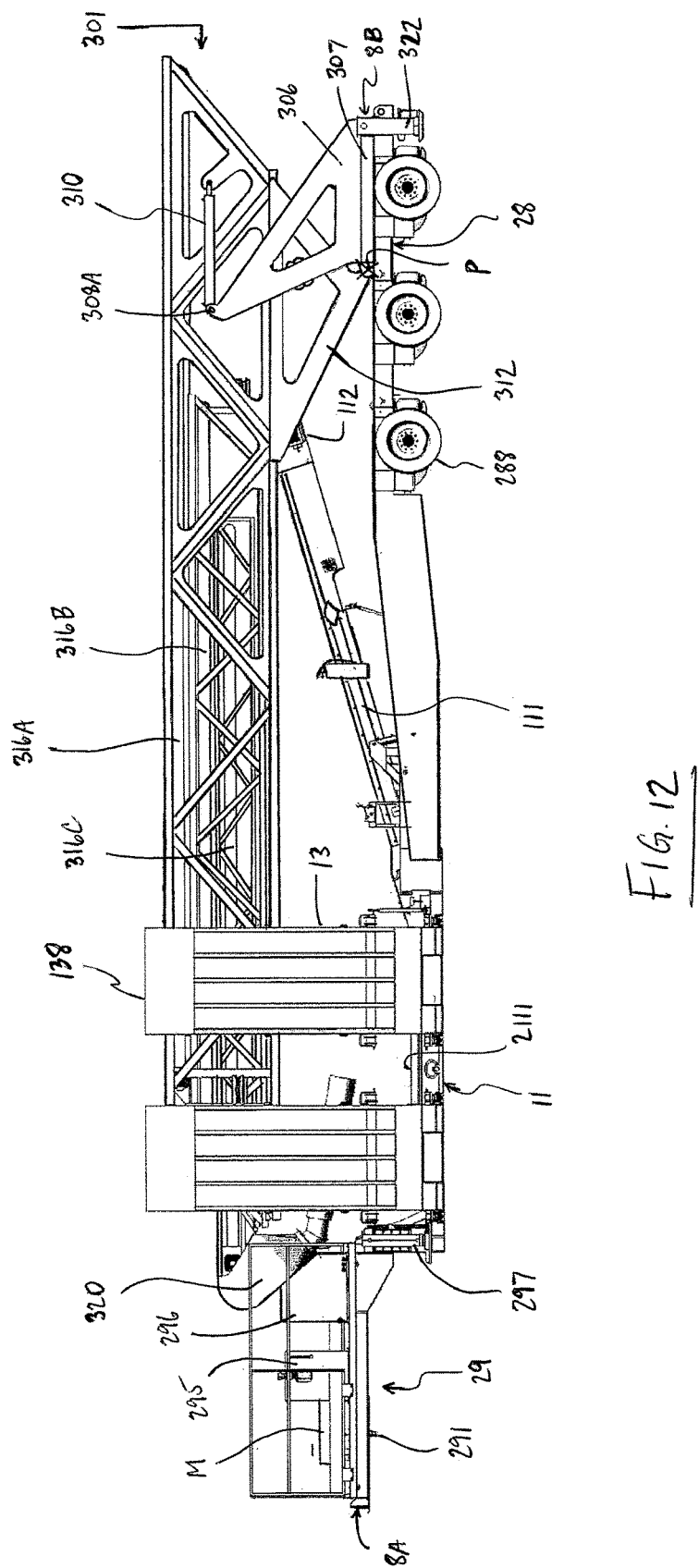
FIG. 12 is a side elevational view of the portable conveyor apparatus of FIG. 1 with the portable conveyor apparatus arranged in a transport position.
Figure 13:
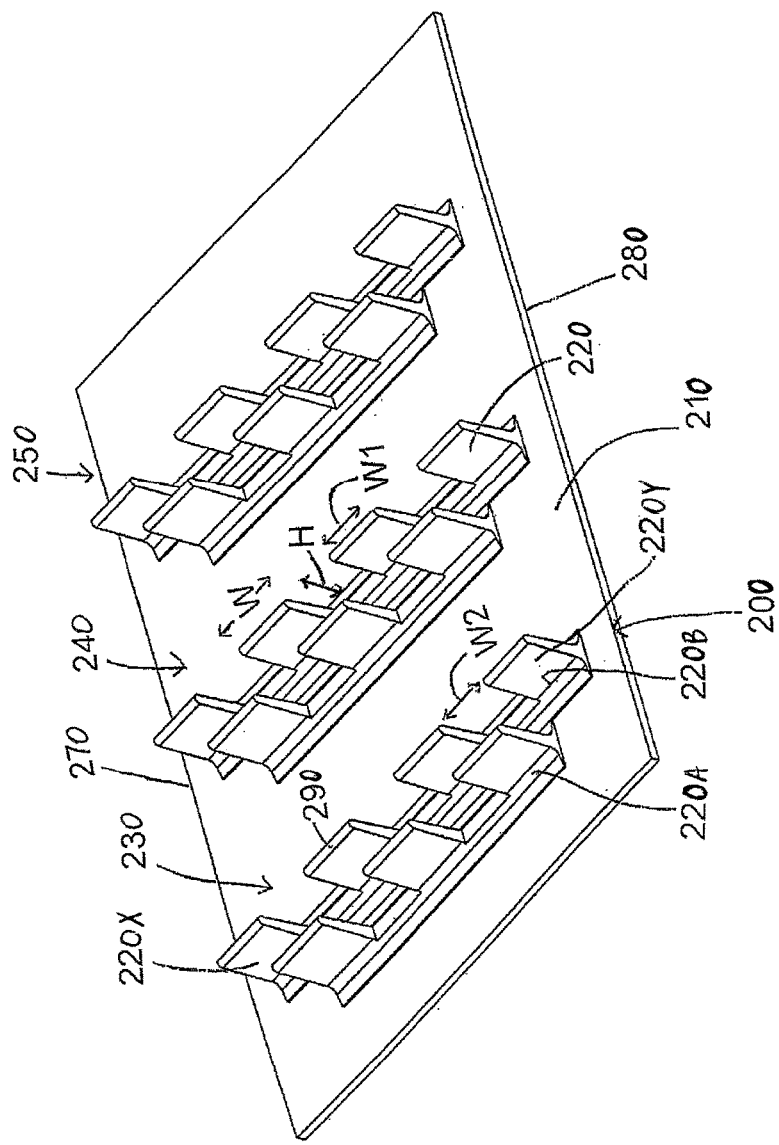
FIG. 13 is an isometric view of a portion of a belt of a second conveyor of the portable conveyor apparatus showing cleats on the belt in flat condition.

The second conveyor 301 comprises a multi-section structure in the illustrated embodiment, which is movable relative to the trailer's overall frame 6 such that the second conveyor is positionable between a working position and a transport position. In the working position, as shown for example in FIGS. 1 and 2, the second conveyor extends beyond the periphery of the trailer 4 so as to discharge the particulate material beyond same. In contrast, in the transport position as for example shown in FIG. 12, the second conveyor lies substantially within the periphery of the frame of the trailer in horizontal orientation, particularly in that the second conveyor does not extend beyond the front end 8A nor beyond the sides 8C and 8D, so as to be suited for transportation. The second conveyor in the transport position may extend rearwardly beyond the rear end 8B of the overall frame 6 but this is within an acceptable permissible amount so that the conveyor apparatus 1 may be towed on a roadway (e.g. a highway). It will also be appreciated that the second conveyor is able to fit in between the ramp assemblies 12 and 13 when they are arranged in the raised position upstanding from the center frame structure, as shown in FIG. 12. Furthermore, in terms of height, the second conveyor in the transport position is arranged below free ends of the ramp assemblies 12, 13 defined by the edges 138 when the ramp assemblies are in upstanding position relative to the center frame structure 11.

The second conveyor structure 301 is thus arranged for pivotal movement about a folding axis F which is transverse to the trailer axis T and by rotational movement about an upstanding axis U which is transverse to both the folding axis F and trailer axis T, by which the second conveyor can be positioned in the transport position and the working position. These movements are described in more detail shortly hereinafter.

A mounting arrangement 304 of the second conveyor includes a pair of upstanding brackets 306 which are interconnected at their bottoms by a transverse base 307. The transverse base 307, which for example forms a plate, is thus arranged for the rotational movement about the upstanding axis U, for example with guide pins (not shown) depending from the base 307 cooperating with a circular track (not shown) in the form of a circumferentially extending slot that is supported on the rear frame 28. Furthermore, the base 307 may be driven in this rotational movement by conventional hydraulics powered by the motor arrangement M and controls 295, 296 at the front of the trailer. In the illustrated embodiment, the upstanding brackets 306 are triangular shaped with an upper vertex 308A which is horizontally spaced from the upstanding axis U.

At each upper vertex 308A there is located a cylinder end of a hydraulic cylinder 310 that is pivotally attached thereto. A pair of such hydraulic cylinders are provided for moving the telescoping sections of the second conveyor, forming a boom, about the horizontally oriented folding axis F. An opposite, piston rod end of the hydraulic cylinders is pivotally attached to a bottom of the boom.

The boom is also attached to the mounting arrangement 304 at pivot point P which is spaced below the upper vertices 308A and is located horizontally intermediate the upstanding axis U at the pivot pin and the upper vertices 308A.

Extension and retraction of the hydraulic cylinders 310 thus raises and lowers the boom by rotating it about the folding axis F, from for example a substantially horizontal orientation in the transport position to an inclined orientation in the working position. In this illustrated arrangement the extension of the hydraulic cylinders 310 acts to raise the boom by pushing outwardly in the direction of the bottom end of the base section 313A so as to bring the top free end upwardly.

When the boom is raised to its steepest possible incline so as to form an angle of for example 40 degrees to the horizontal, the bottom of the boom may rest on the transverse base 307 of the mounting arrangement 304. The steepest inclined angle of the boom may be limited by a shape of a bottom of the boom.

Part of the base of the boom includes gusset-like members 312 which reinforce connection of the boom at the mounting arrangement and may provide further support to the boom when inclined in the working position. It is at these gusset-like members, which are triangular plates with a central opening so as to reduce an amount of material in the plates, where the boom is pivoted at P.

The second conveyor is formed in three sections in the illustrated arrangement of FIGS. 1-15 with a first base section 313A which is pivotally attached to the mounting arrangement 304 and two extendible sections 313B, 313C which are movable along a conveyor axis C relative to the first base section. The conveyor axis defines the axis parallel to which the particulate material is transferred along the second conveyor.

Each section comprises a pair of parallel side members 314A, 314B receiving therebetween a conventional conveyor belt arrangement with horizontal drive members carrying an endless planar belt. This belt may have different shapes, including being flat and smooth like indicated on the conveyor portion 316C; having a plurality of protrusions spaced from one another and arranged in a chevron-pattern across the belt as indicated on the conveyor portion 316B; or a cleat arrangement as indicated on conveyor portion 316A similar to what is described in US Patent Publication No. 2010/0326798 belonging to the Applicant, which is incorporated herein by reference. A difference between these various shapes, which are particularly but not exclusively shaped differently in an outward normal direction to a plane of the respective belt, is an ability to carry the particulate material along the second conveyor when positioned at steeper inclines.

Each successive section from the first base section 313A towards the last end section includes the side members 314A, 314B spaced apart at a smaller distance such that the respective telescoping section can be received in sliding movement within the adjacent section which is closer to the base of the boom.

The telescoping sections 313A-313C are therefore arranged in an overlapping configuration so that, when the sections are extended each beyond the next, the particulate material is transferrable from each second conveyor section to the next. That is, one conveyor belt of a respective section moves particulate material therealong, and at an end of that section the conveyed particulate material falls onto the belt of the next section and continues to move along the conveyor axis C.

As such, each section of the second conveyor is uncovered across its full width and along its length such that the sections may be extended to one another at any distance less than a maximum extension of the respective section. As such, the length of the second conveyor is variable for discharging the particulate material at different distances horizontally outwardly from the periphery of the trailer.

Figure 2:
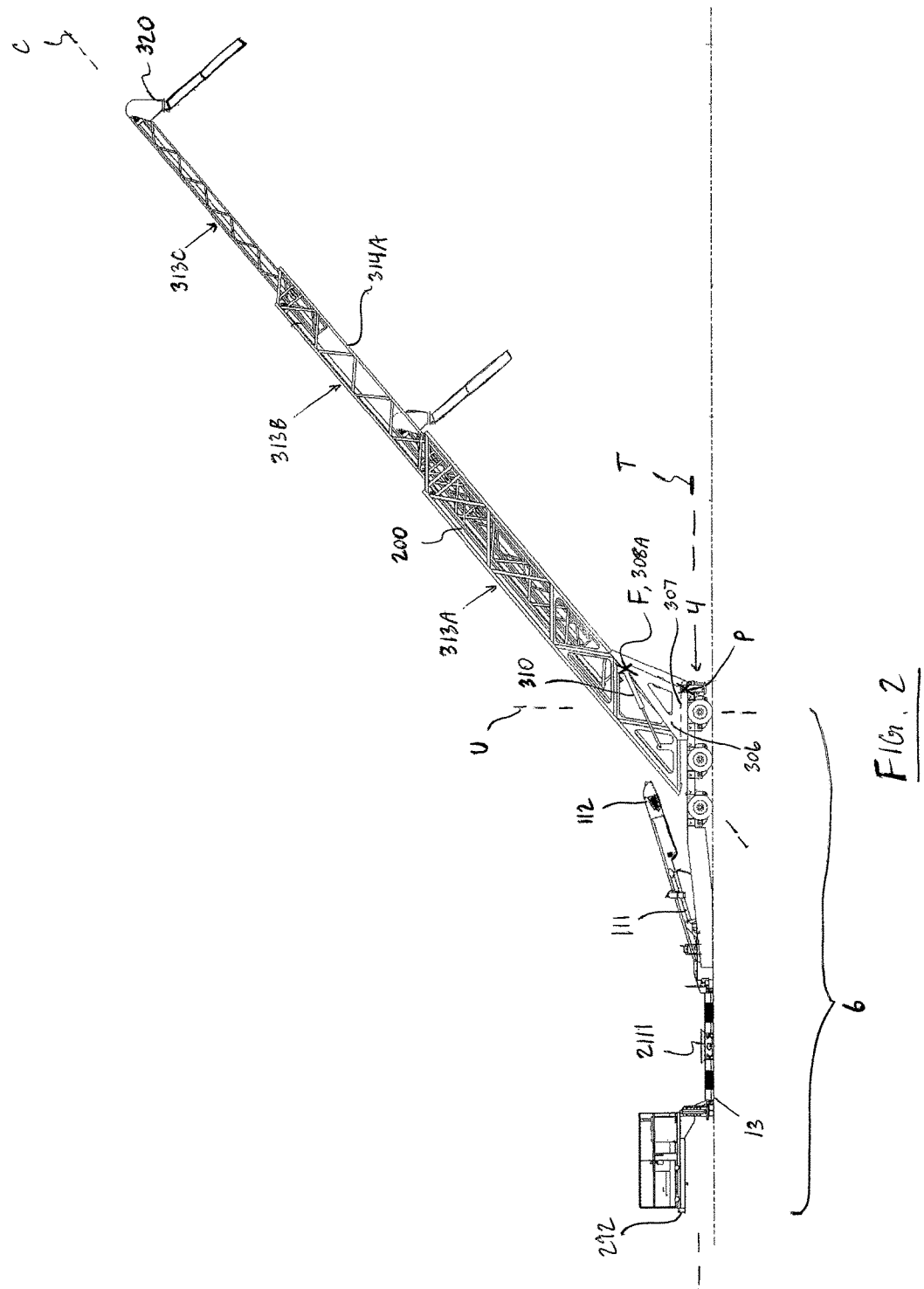
FIG. 2 is a side elevational view along line 2-2 in FIG. 1.
Figure 3:
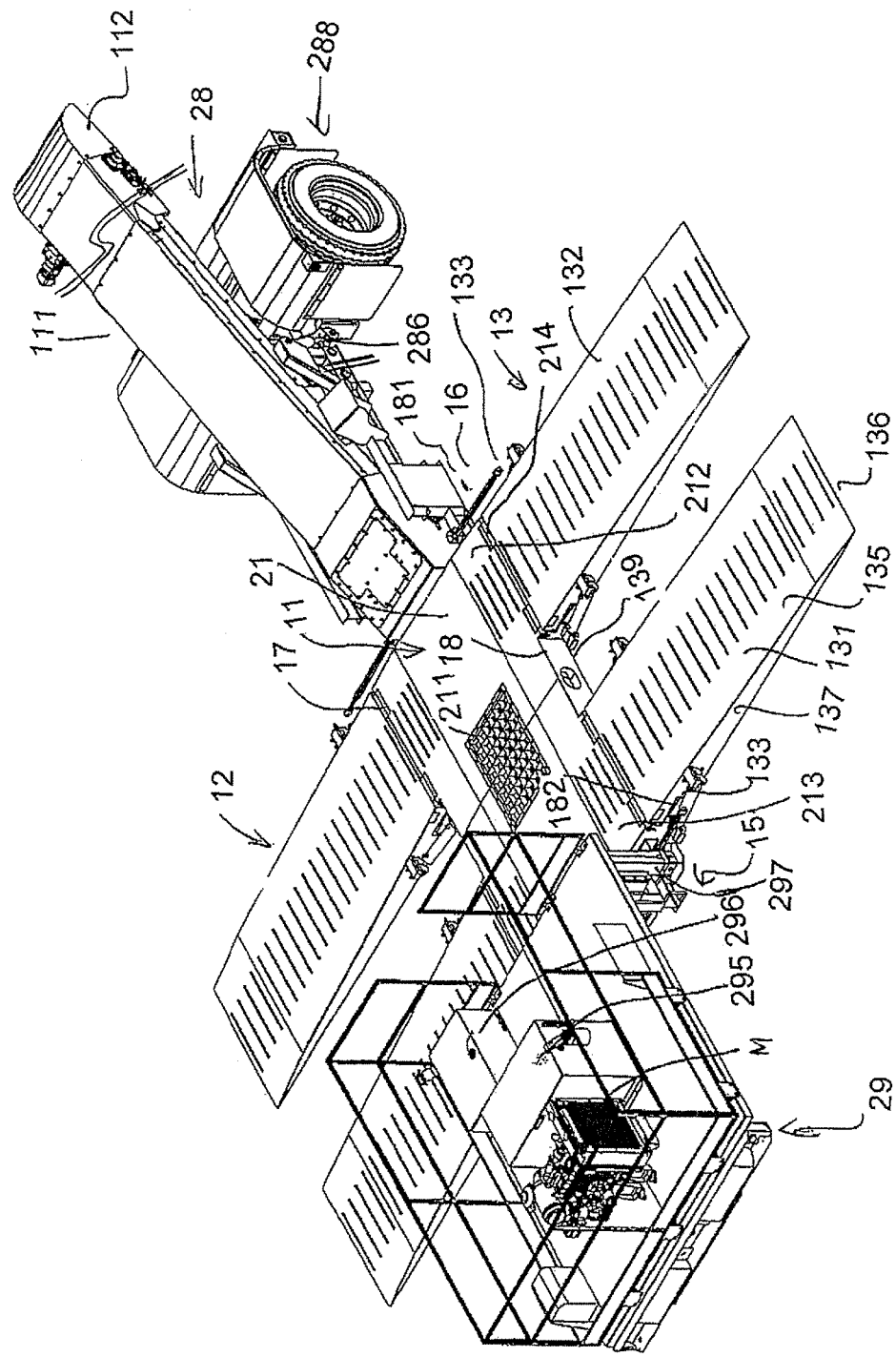
FIG. 3 is an isometric view of a portion of the portable conveyor apparatus of FIG. 1 omitting some components and truncating some components (indicated by pairs of parallel lines) for clarity of illustration.
Figure 4:
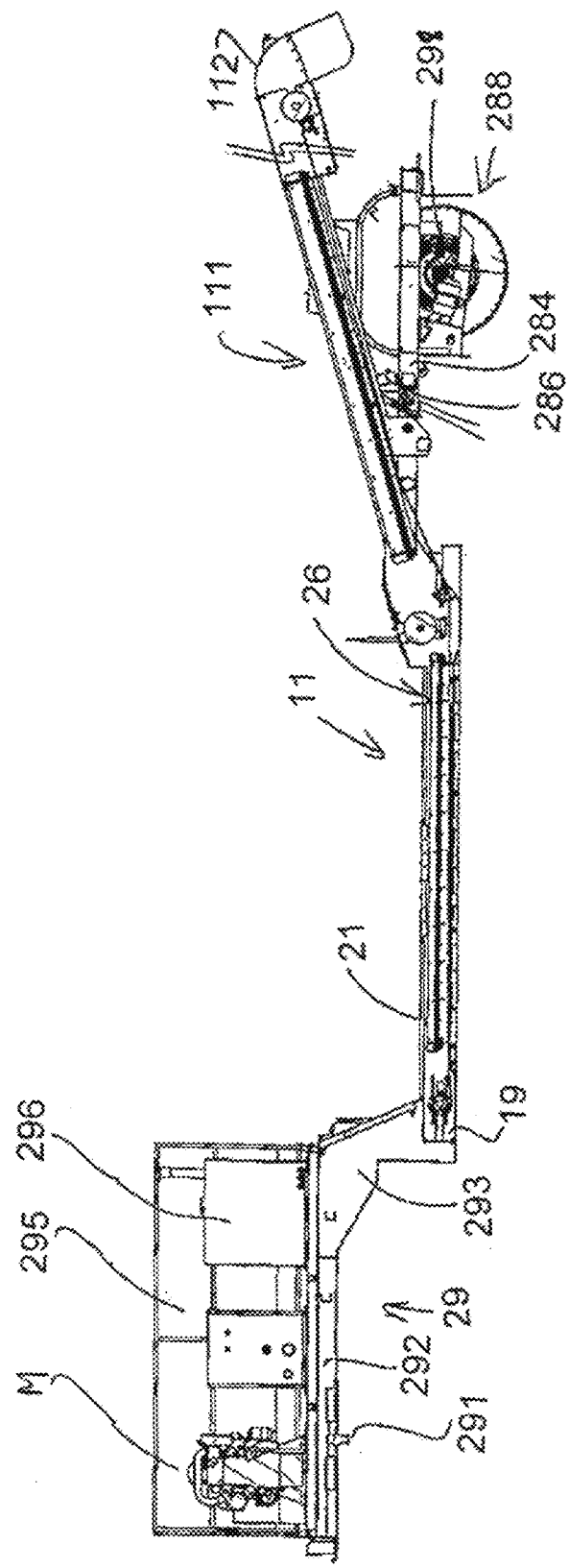
FIG. 4 is a vertical central cross sectional view of the portion shown in FIG. 3.
Figure 6:
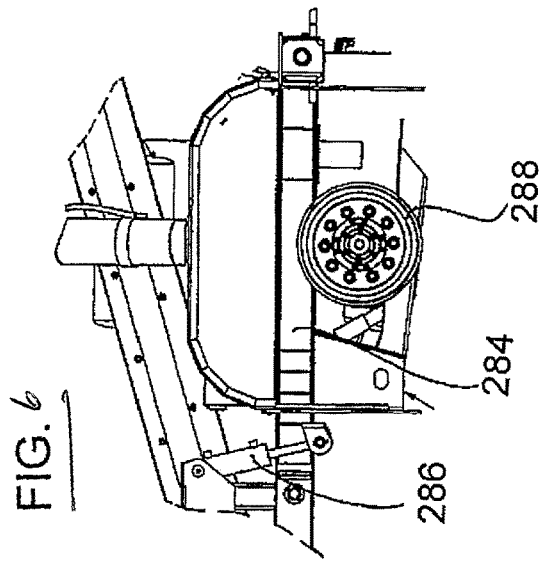
FIG. 6 is part only of the vertical central cross sectional view of FIG. 4 on an enlarged scale showing rear frame and ground wheels.
Figure 5:
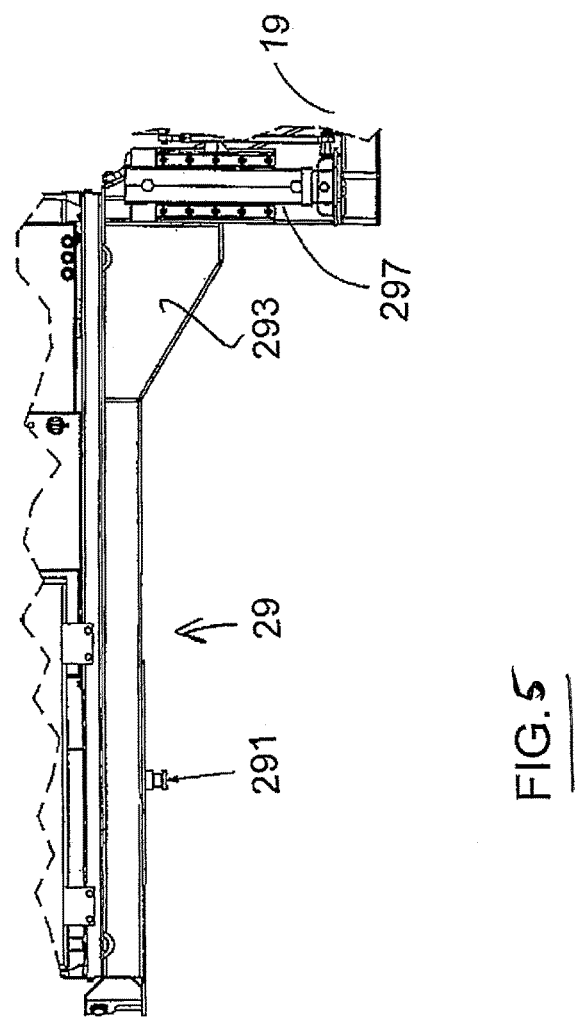
FIG. 5 is a part only of the vertical central cross sectional view of FIG. 4 on an enlarged scale showing the front platform.

In the typical working position as shown in FIGS. 1 and 2, the second conveyor extends rearwardly of the periphery of the trailer with the first conveyor 26 spanning a distance between its inlet 211 and the mounting location of the second conveyor on the overall frame 6. The mounting arrangement 304 provides swivable mounting of the second conveyor such that the particulate material is dischargeable at different locations angularly of the trailer axis T in a horizontal plane containing the trailer axis.

As more clearly shown in FIG. 2, the last end section 313C includes a discharge chute 320 at its furthest end from the trailer (in the working position). This discharge chute 320 tapers from a respective first catchment portion, which opens towards the conveyor belt, to a respective second cylindrical portion which is inclined rearwardly and downwardly from the boom in the working position.

It will be appreciated that in FIG. 2 the last end section 313C including the discharge chute 320 is shown at an example position, illustrated in ghost, where the multiple sections 313A-313O of the second conveyor are in the working position but are retracted relative to one another so as to more clearly show that the second conveyor may be positioned in a fashion such that the particulate material is dischargeable at a smaller distance from the trailer 4 than that distance otherwise indicated by a fully extended working position of the second conveyor in FIG. 2.

In use, the portable conveyor is transported by towing vehicle, such as a highway tractor, to the desired unloading location. The first and second ramps 12, 13 are then folded out so that the dump trucks are able to drive over the central frame 11 structure and deposit their contents over the inlet 211 of the first conveyor. Also, the second conveyor 301 is moved from the transport position to the working position by the movements about the folding and upstanding axes F, U as described earlier. Leg jacks 322 provided at the rear 8C of the trailer may be lowered into engagement with the ground support surface below so as to stabilize the second conveyor in its inclined orientation outwardly beyond the periphery of the trailer.

When the respective dump truck, which may be of a center dump or end dump variety, unloads its particulate contents through the inlet of the first conveyor, the first conveyor 26 is operated so as to transfer the particulate material rearwardly along the trailer 4 to its discharge 112 where the particulate material is received onto the second conveyor 301 therebelow. The discharge 112 of the first conveyor is located over an inlet of the second conveyor, which in the illustrated embodiment is not formed by a dedicated structure to channel the particulate material onto the conveyor belt but rather is defined by a starting end of the first base telescoping section 313A that is over top of the rear end 28 of the trailer. In other embodiments, a dedicated funneling structure which opens towards the discharge chute 112 of the first conveyor may be provided.

The second conveyor 301 is thus operated so as to transfer the particulate material therealong. The sections 313B, 313C subsequent to the first base section may be retracted relative thereto such that the particulate contents are conveyed primarily along the first section 313A and briefly along the last section 313C before being discharged through the discharge chute 320. Alternatively, the subsequent sections may be extended relative to the first base section and from one another such that the particulate material traverses along each of the telescoping sections 313A-313C before being discharged at the discharge chute 320.

The second conveyor may be adjusted angularly of the upstanding axis U so as to change the location of discharge of the material relative to the trailer axis T. The second conveyor may be swiveled up to for example an angle of 30 degrees from the trailer axis T to one side thereof. Furthermore, in the working position the second conveyor is typically positioned so as to extend rearwardly of the trailer and may extend to one side or the other of the trailer 4. The second conveyor is also inclined so as to extend upwardly.

Moreover, the telescoping sections can be moved relative to one another so as to adjust at least one of (i) the distance at which the particulate material is discharged from the trailer and (ii) an elevation or height at which the material is discharged. Similarly, the boom can be tilted so as to be raised up to for example 60 degrees from the horizontal or lowered to for example 10 degrees above the horizontal so as to adjust at least one of the discharge distance from the periphery of the trailer and the discharge height from the trailer.

Once all desired material has been transferred, the portable conveyor apparatus 1 may be arranged such that the second conveyor 301 is positioned in the transport position so as to be tucked in within the periphery of the trailer, and the first and second ramps 12, 13 folded so as be upstanding to the frame. The portable conveyor apparatus is thus ready for transportation to a different location.

Figure 14:
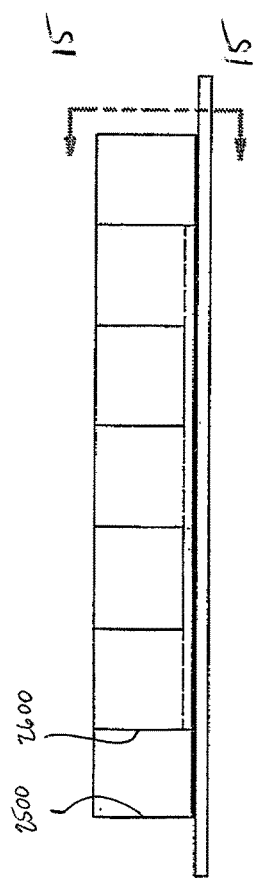
FIG. 14 is a rear elevational view of the portion of the belt of the second conveyor of FIG. 13 showing the cleats on the belt in flat condition.
Figure 15:
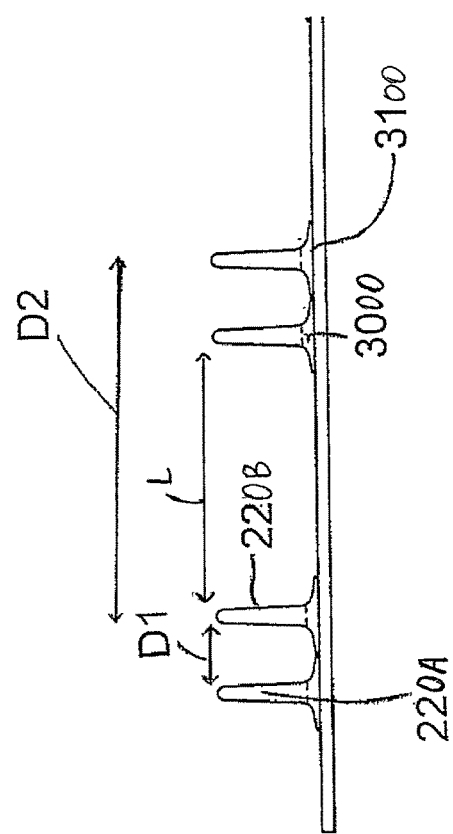
FIG. 15 is a side elevational view of the portion of the belt of the second conveyor of FIG. 13, as if it were taken along line 15-15, showing the cleats on the belt in flat condition.
Figure 16:
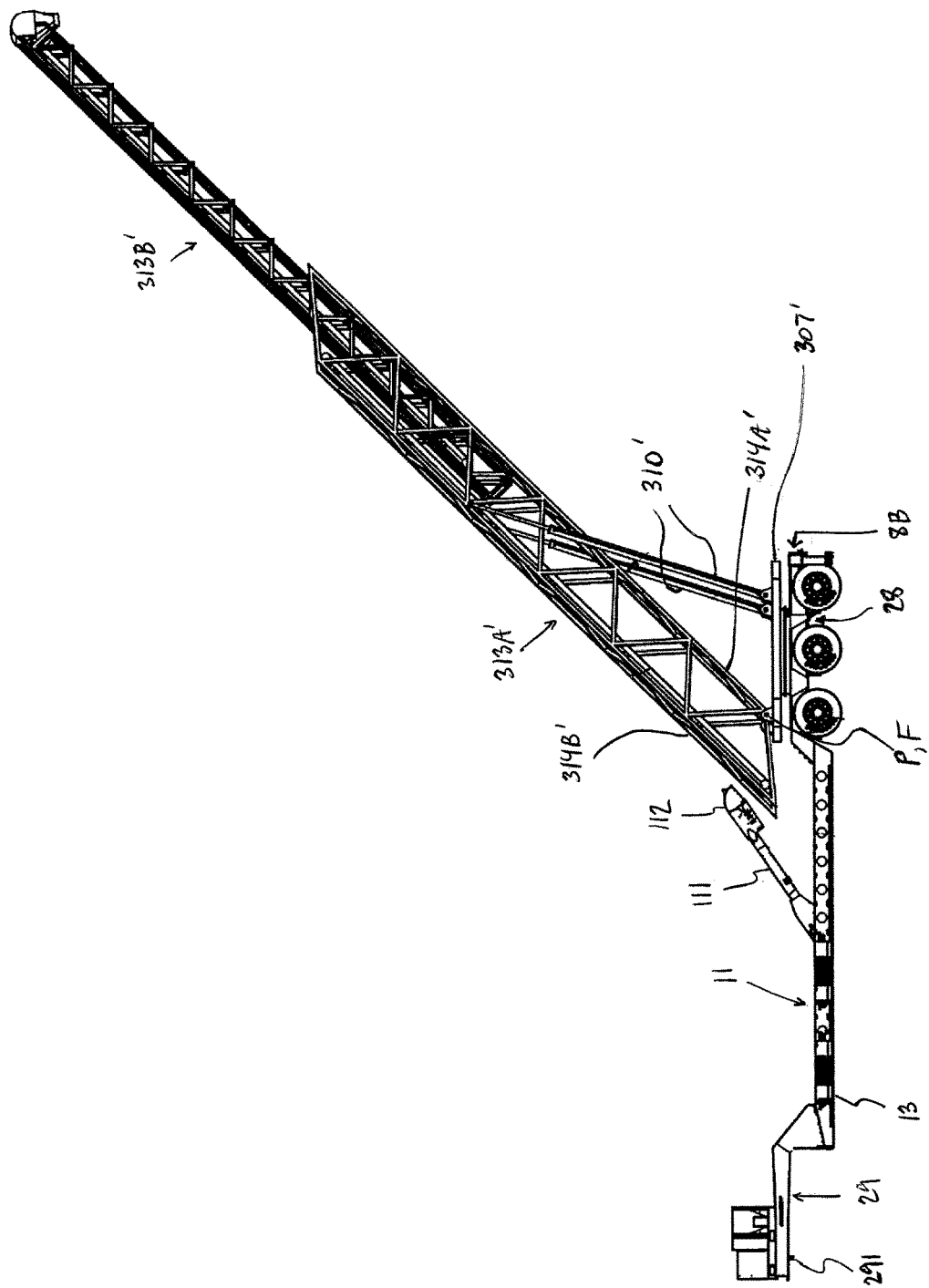
FIG. 16 is a side elevational view of another arrangement of portable conveyor apparatus according to the present invention showing the apparatus in a working position.

Turning to the cleat arrangement of the second conveyor in more detail and referring particularly to FIGS. 14 to 16, there is provided a plurality of paddle members 220 mounted on and projecting upwardly from an upper surface of the endless belt 200 for restricting back flow under gravity of the particulate material on the upper surface. The endless belt is arranged to conform to a shape of a surface over which it travels, such that the endless belt may lie in flat configuration or in curved configuration if for example the drive rollers and any guide surface therebetween are curved concave relative to the conveyor axis C. The endless belt may transition from one configuration to the other depending on shapes of the drive rollers and any guide surfaces defining the path of the respective belt 200.

The paddle members are arranged in rows of adjacent paddle members, for example a row 220A and a row 220B. The row 220B includes four paddles and the row 220A includes three paddles. The paddle members of the row 220A and the row 220B are spaced longitudinally of the belt by a distance D1 so as to avoid contact between the paddles members of the pair in either the flat configuration or as the paddle members are moved inwardly as the belt curves into the curved configuration. That is, one is located in front of the other so that there is no possibility of interference.

The distance D1 between the paddle members of the pair is however selected such that the particulate material is inhibited from back flowing between the paddle members under gravity at least in the curved configuration.

The paddle members are arranged in groups 230, 240, 250 along the belt. Each group is spaced longitudinally of the belt from the next adjacent group such that adjacent paddle members of the group are spaced longitudinally of the belt by the distance D2. This distance is of course sufficient to avoid contact between the adjacent paddles members of the group in either the flat configuration or as they move to the curved configuration. In addition the spacing between groups is arranged to reduce the number of the groups so that they are reduced to a lower number for cost reduction and for weight reduction. Typically the space therefore between each group and the next group is of the order of 6 inches. Thus the number of groups along the belt is selected so as to be as small a number as can be acceptable to provide the required restriction to back flow of the material on the belt in the inclined portion of the belt. This number may vary depending on the flow characteristics of the material to be transported.

The paddle members are arranged to be relatively high in comparison with prior art members of this general type and they are allowed to be so due to the offset configuration described above. Thus they can have a height H of at least 1.0 inches, or at least 1.5 inches and typically they are of the order of 2.0 inches.

At least some of the paddle members and typically all of them are shaped so that they are rectangular with sides 2500 and 2600 parallel and at right angles to the top surface of the belt. They are spaced transversely by a distance W2 which is approximately equal to or slightly less than the width W1 of the paddles. In an alternative, not shown, the width W of each paddle across the belt increases in relation to the height H from the belt with their side edges 2500 and 2600 inclined upwardly and outwardly from the upper surface 210 typically at an angle of the order of 75 degrees.

The paddle members 220X and 220Y of the row 220B which are closest to side edges 270 and 280 of the belt are spaced inwardly from the side edges by a distance approximately equal to the width of a paddle member. The three paddle members in the row 220A are arranged so as to be offset from the paddle members in the row 220B so that they are aligned with the three spaces between the paddle members of the row 220B.

Each group 220B contains typically four paddle members although this number may be increased for a wider belt. The group containing four paddle members can be in advance of or behind the group containing three paddle members. The group is injection molded as an integral item from rubber or similar material with a base 3000 which forms a flat bottom surface 3100 which is attached to the upper surface of the belt using a typical vulcanization process. From the flat bottom 3100, the base tapers upwardly and inwardly to the bottom of the paddle members. The width of the base is sufficient to provide effective attachment to the belt. The groups are arranged such that the base of one touches the base of the next and this defines the spacing D1. The paddles themselves are slightly tapered upwardly and inwardly to the top edge both in the width and length directions to allow ready removal from the mold.

Typically the longitudinal spacing D1 between adjacent pairs is at least 1 inch and preferably 2 inches. This spacing is typically suitable to stop backflow of particulate materials in combination with the above spacing between the paddle members by which they overlap when viewed from the rear as shown in FIG. 14.

Typically the longitudinal spacing L between groups is at least 6 inches and preferably 9 inches. This separates the paddle members into individual groups so that each group operates in effect as a single cleat.

Each paddle member thus comprises a substantially flat plate which stands outwardly from the upper surface at right angles to the upper surface with the base 3000 attached to the upper surface and curves inwardly and upwardly to the flat plate.

The belt as shown has the advantages that it does not in any way squeeze or pinch the product to cause a crushing effect and also the design allows use of a higher cleat design, that is, the paddle members can have a greater height in view of the longitudinal offset which avoids any possible interaction between the paddle members.

Thus the paddle members cooperate in an arrangement where two paddle members of the front row define between them a space which is sufficient to allow the paddle members to lie side by side and to avoid contact when moved into the curved configuration and a third paddle member of the rear row is positioned behind the space between the two paddle members of the front row with a width of the third paddle member which co-operates with the distance between the front row and the rear row to prevent flow or material between the front two paddle members from moving rearwardly beyond the third paddle member.

Figure 17:
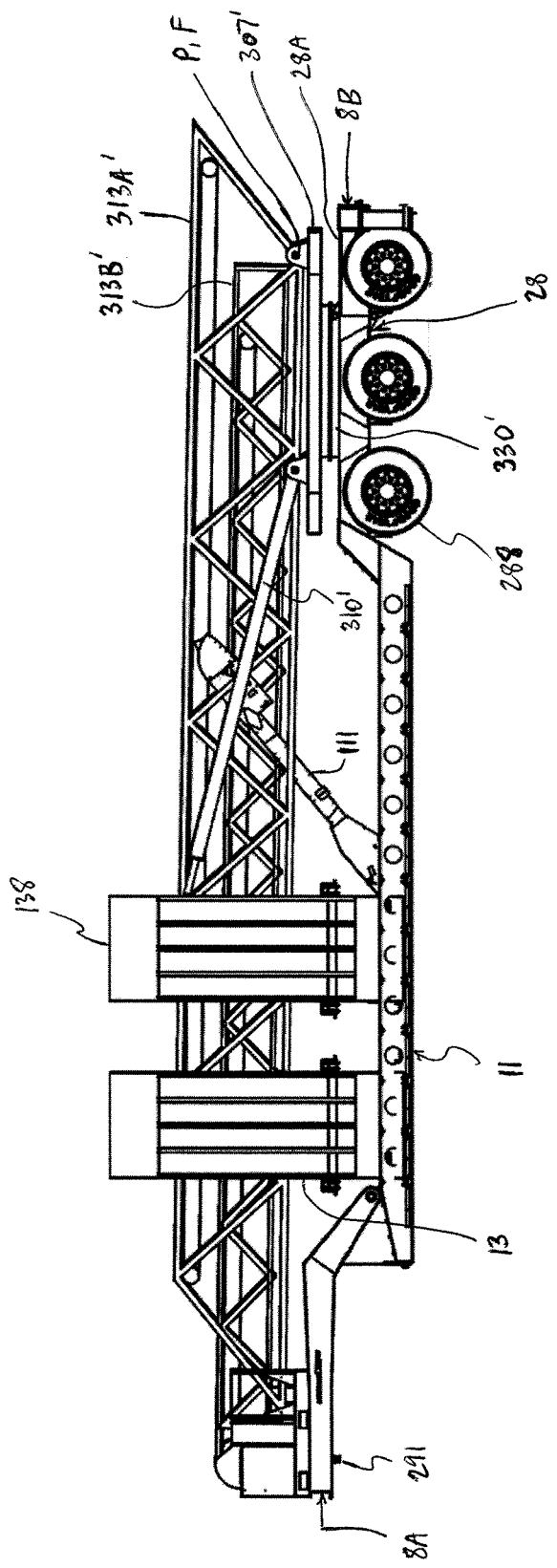
FIG. 17 illustrates in side elevation the second arrangement of apparatus as in FIG. 16 but showing it in a transport position.

FIGS. 16 and 17 show another arrangement of portable drive-over conveyor apparatus 1' with two telescoping sections 313A', 313B' and having a mounting arrangement 304' which comprises a base telescoping section 313A' omitting the gusset-like members indicated at 312 in the first arrangement. As such, side members 314A', 314B' forming the first base section 313A' are directly coupled to the base at pivot point P. Furthermore, hydraulic cylinders 310' are connected at a cylinder end to a rotatable base 307' of the mounting arrangement at a spaced location from the pivot P, and at a piston rod end to the base telescoping section 313A' at a location thereon spaced from the bottom connected to the base 307' towards but spaced from an opposite top end of the section 313A'. Thus, in this alternate arrangement, extension of the hydraulic cylinders 310' acts to raise the boom by pushing upwardly on the base telescoping section 313A' thereby locating the folding axis F at the same location as the pivot point P.

Also, in this second arrangement, it is more clearly shown that the base 307' of the mounting arrangement rotates in a conventional manner known to a person skilled in the art on a pedestal 330' carried at the rear frame 28 such that the base 307' is held spaced above a top face 28A of the rear frame for rotational movement thereover.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A portable conveyor apparatus comprising:
   a trailer frame with front and rear ends longitudinally opposite one another and first and second sides where the front end, rear end, first side, and second side collectively define a periphery of the trailer frame;
   a hitch coupling mounted to the trailer frame for coupling to a towing vehicle;
   a plurality of wheels rotatably coupled to the trailer frame such that the trailer frame is towable across a support surface by the towing vehicle;
   a first conveyor carried by the trailer frame and operable to receive particulate material unloaded from a truck at an inlet end of the first conveyor located within the periphery of the trailer frame and to transfer the particulate material to a discharge of the first conveyor longitudinally spaced from the inlet end of the first conveyor;
   ramp assemblies mounted to the trailer frame on either side of the first conveyor generally at the inlet end thereof so that the truck to be unloaded is drivable over the ramp assemblies to be positioned over the inlet end of the first conveyor for unloading
   an upper surface provided between the first and second sides of the trailer frame above the first conveyor at the inlet end thereof to support the truck moving from one of the ramp assemblies transversely of the trailer frame to the other one of the ramp assemblies;
   the upper surface defining an opening so that the particulate material unloaded from the truck passes through the opening to the first conveyor at the inlet end thereof;
   a second conveyor mounted on the trailer frame above the upper surface at a mounting location which is spaced longitudinally from the inlet end of the first conveyor for transferring the particulate material operably received from the discharge of the first conveyor to a desired location beyond the trailer frame;
   the discharge of the first conveyor being located above the upper surface so that the first conveyor is operable to deliver the particulate material to an inlet of the second conveyor which is located above the upper surface;
   the second conveyor being movable relative to the trailer frame between a transport position in which a discharge of the second conveyor is located within the periphery of the trailer frame so as not to be operable to transfer the particulate material to the desired location, wherein in the transport position the second conveyor is disposed in a manner overlying the opening defined in the upper surface which communicates the first conveyor at the inlet end thereof, so that movement of the truck from said one of the ramp assemblies, onto the upper surface and to the other one of the ramp assemblies is obstructed by the second conveyor, and a working position in which the discharge of the second conveyor is located outside the periphery of the trailer frame so that the second conveyor extends from the mounting location and across the periphery of the trailer frame to transfer the particulate material to the desired location.

2. The portable conveyor apparatus of claim 1, wherein the second conveyor comprises a plurality of paddle members mounted on a surface of the second conveyor such that back flow of particulate matter under gravity is restricted.

3. The portable conveyor apparatus of claim 1, wherein the discharge of the second conveyor is movable relative to the trailer frame by pivotal movement of the second conveyor relative to a substantially horizontally oriented pivot axis to adjust a height of the discharge of the second conveyor above the trailer frame in the working position.

4. The portable conveyor apparatus of claim 1, wherein the second conveyor is swivably mounted on the trailer frame so as to be rotatable about an upstanding axis located within the periphery of the trailer frame such that the particulate material is dischargeable from the second conveyor at different locations angularly of a longitudinal axis extending through the front and rear ends of the trailer frame.

5. The portable conveyor apparatus of claim 1, wherein the second conveyor comprises a plurality of telescoping sections movable each relative to the next along a conveyor axis of the second conveyor parallel to which the particulate material is transferred along the second conveyor.

6. The portable conveyor apparatus of claim 5, wherein a first one of the telescoping sections, which is supported in fixed relation to a mounting arrangement which mounts the second conveyor to the trailer frame, is supported in overlapping configuration with another one of the telescoping sections which is extendable relative to the first one of the telescoping sections such that the particulate material is transferrable from one telescoping section to the next therebelow when the second conveyor is in the working position and said another one of the telescoping sections is extended beyond the first one of the telescoping sections.

7. The portable conveyor apparatus of claim 1, wherein a top of the second conveyor is uncovered across its width and along its length.

8. The portable conveyor apparatus according to claim 1 wherein the mounting location of the second conveyor is spaced rearwardly of the inlet end of the first conveyor.

9. The portable conveyor apparatus according to claim 1 wherein the second conveyor is extendable from a retracted length which is less than a length of the trailer frame between the front and rear ends thereof, to an operating length exceeding the retracted length.

10. The portable conveyor apparatus according to claim 1 wherein the first conveyor is mounted in fixed relation to the trailer frame.

11. The portable conveyor apparatus according to claim 1 wherein in the transport position the second conveyor is located substantially within the periphery of the trailer frame.

12. The portable conveyor apparatus according to claim 1 wherein in the transport position the second conveyor is oriented substantially horizontally.

* * * * *